United States Patent
Nakatsukasa

(10) Patent No.: US 6,631,691 B1
(45) Date of Patent: Oct. 14, 2003

(54) DEVICE FOR GEL-COATING SEEDS

(75) Inventor: Kazushi Nakatsukasa, Hyogo (JP)

(73) Assignee: Agritecno Yazaki Co., Ltd., Hyogo (JP)

( * ) Notice: Subject to any disclaimer, the term of this patent is extended or adjusted under 35 U.S.C. 154(b) by 0 days.

(21) Appl. No.: 09/890,044

(22) PCT Filed: Dec. 2, 1999

(86) PCT No.: PCT/JP99/00641

§ 371 (c)(1), (2), (4) Date: Jul. 25, 2001

(87) PCT Pub. No.: WO00/47034

PCT Pub. Date: Aug. 17, 2000

(51) Int. Cl.[7] .................................................. B05C 5/02
(52) U.S. Cl. .............................. 118/13; 118/29; 118/30
(58) Field of Search .............................. 118/13, 16, 17, 118/29, 30, 300; 427/4, 212

(56) References Cited

U.S. PATENT DOCUMENTS 4,806,357 A * 2/1989 Garrett et al. .................. 427/4
6,261,371 B1 * 7/2001 Nakatsukasa et al. ......... 118/13

FOREIGN PATENT DOCUMENTS

JP 7-264901 10/1995
JP 9-98606 4/1997

* cited by examiner

Primary Examiner—Richard Crispino
Assistant Examiner—Yewedbar T Tadesse
(74) Attorney, Agent, or Firm—Knobbe, Martens, Olson & Bear LLP

(57) ABSTRACT

A device for gel-coating seeds having a structure in which a gelling agent is filled into a nozzle, and seeds are charged into and held in the gelling agent to form gel-coated seeds which are then allowed to fall. A nozzle (98) into which a gelling agent and seeds are charged is provided to the nozzle casing (70)(71) of a processing unit (2), and open/close rod (73) at a nozzle intermediate portion is slidably inserted into the upper portion of the nozzle casing, an air chamber (70b), in which a piston (74a) of a compression pin (74) sliding interlockingly with the open/close rod (73) can reciprocate, is provided below the rod, the air chamber (70b) being allowed to communicate with the nozzle (98), the upper portion of the nozzle (98) is blocked with the open/close rod (73) after the gelling agent is filled in a drop hole (98b) in the lower portion of the nozzle and the seeds are charged, air is fed into the nozzle (98) by allowing the piston (74a) above the nozzle to slide, and gel-coated seed are discharged from the nozzle.

6 Claims, 10 Drawing Sheets

DEVICE FOR GEL-COATING SEEDS

This application is the U.S. National Phase under 35 U.S.C. §371 of International Application PCT/JP99/00641, filed Dec. 2, 1999.

TECHNICAL FIELD

The present invention relates to a device for gel-coating seeds and more particularly to a device which continuously and simultaneously coats a plurality of seeds with a gelling agent, wherein the device is applicable to a whole size of seeds.

BACKGROUND ART

Conventionally, there is a well-known device for coating seeds with a gelling agent mixed with nutriment, medicament or the like, which has a plurality of nozzles into which respective seeds are dropped and the gelling agent is filled. The process of gel-coating a seed in each of the nozzles is performed as follows:

First of all, a little amount of gelling agent is discharged into the nozzle so as to form a gel-membrane blocking in a bottom tip of the nozzle. Next, a seed is dropped into the nozzle so as to be caught with the gel-membrane. Then, the gelling agent is more filled into the nozzle so as to thicken the gel-membrane, thereby gel-coating the seed. This gel-coated seed falls from the bottom tip of the nozzle with its empty weight.

Incidentally, the gel-coated seeds from the nozzles fall into hardener solution. The gel-coated seeds are conveyed in the hardener while their gel-coats are hardened. Then, the gel-coated seeds are carried into a rinsing unit such that the hardener stuck on the gel-coated seeds is rinsed out. Thus, the gel-coated seeds are finished to be products.

The nozzle unit of the conventional device for gel-coating seeds as mentioned above has a drawback such that each nozzle is supplied into its bottom tip with a gelling agent, which is substantially horizontally discharged from a longitudinal or lateral side of the nozzle. If the pressure for discharging the gelling agent is insufficient, it may happen that the gel-membranes, i.e., the gel-coated seeds cannot be formed.

Besides, the gel-coated seeds fall from the bottom tips of the nozzles with their empty weight. If the seeds are very small, it may happen that the seeds do not acceptably fall from the nozzles.

DISCLOSURE OF THE INVENTION

The present invention is a device for gel-coating seeds having a nozzle into which a gelling agent is filled and a seed is charged and held in the gelling agent to form a gel-coated seed which is then allowed to fall. The nozzle vertically penetrates a nozzle casing which is divisible up and down. A joint surface through which the upper and lower parts of the nozzle casing are joined together is disposed higher than a gel-filled portion of the nozzle. A gallery for the gelling agent is formed on the joint surface. The lower part of the nozzle casing is formed therein with a passage from the gallery to be connected to the gel-filled portion below the gallery. Due to such a structure, the gelling agent is charged downward into the gel-filled portion of the nozzle. Therefore, the pressure for discharging the gelling agent is increased to surely form a gel-membrane for receiving the seed.

The gallery for the gelling agent may be compactly formed into a groove which is circular centering a horizontal section of the nozzle, when viewed in plan, thereby enabling the gelling agent to be sufficiently stored around the nozzle.

The passage from the gallery to the gel-filled portion of the nozzle may comprise a pair of paths arranged in opposite to each other with respect to an axis of the nozzle to communicate to the gel-filled portion. More than one of the pair of paths may be disposed at regular intervals. Therefore, the gelling agent is evenly dispersed and filled into the gel-filled portion of the nozzle from all the paths, thereby forming an even gel-membrane.

Furthermore, a nozzle intermediate portion is formed into an open/close portion that can be switched between opening and blocking states. Compressed air can be charged into a portion of the nozzle between the open/close portion and the gel-filled portion. The air is charged synchronously with the blocking state of the open/close portion. Therefore, this air pressure surely makes the gel-coated seeds, even if they are granular and light, fall from the nozzle.

Incidentally, the open/close portion of the nozzle may be constituted by reciprocally inserting an open/close member, in which a part of said nozzle is formed, into the nozzle casing forming the nozzle. In the same nozzle casing, an air chamber is formed so as to communicate with a portion of the nozzle between the open/close portion and the gel-filled portion. A piston interlocking with the open/close member is reciprocally inserted into the air chamber so as to pressure-charge air into the nozzle. Therefore, the above-mentioned structure wherein gel-coated seeds are dropped by air-pressure can be obtained.

Furthermore, if there are disposed a plurality of the nozzles, a means for integrally reciprocating all the open/closing members and the pistons provided to the respective nozzles may be provided so as to exert the effort of the compressed air to all the nozzles simultaneously.

BEST MODE FOR CARRYING OUT THE INVENTION

Figure 2:
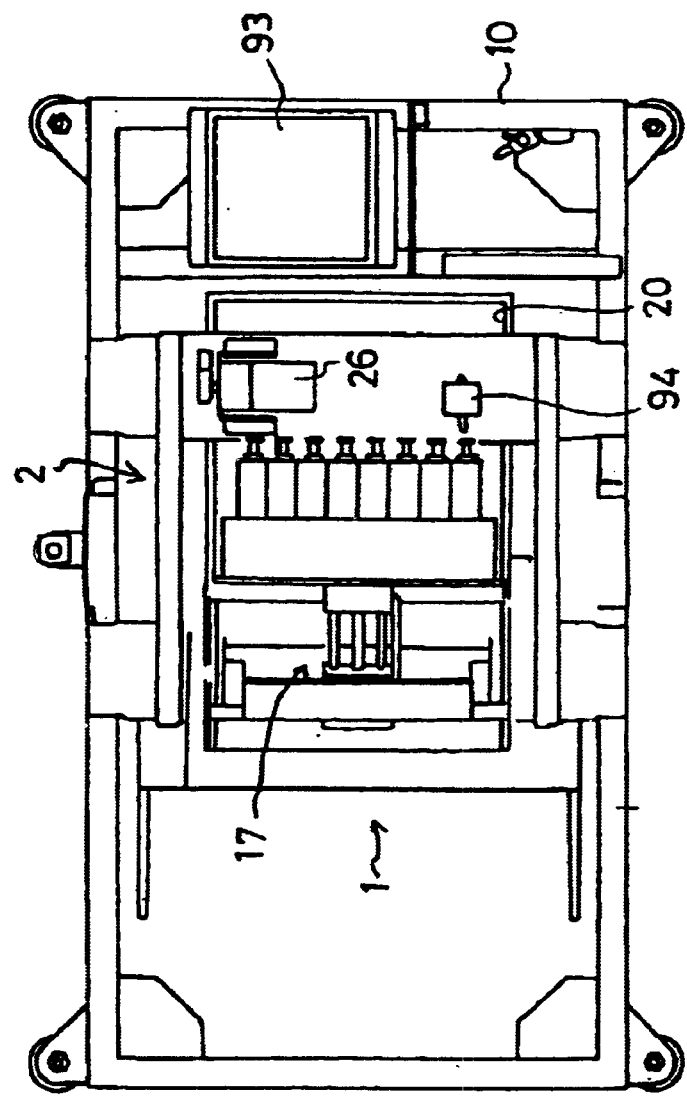
FIG. 2 is a plan view of the same.
Figure 3:
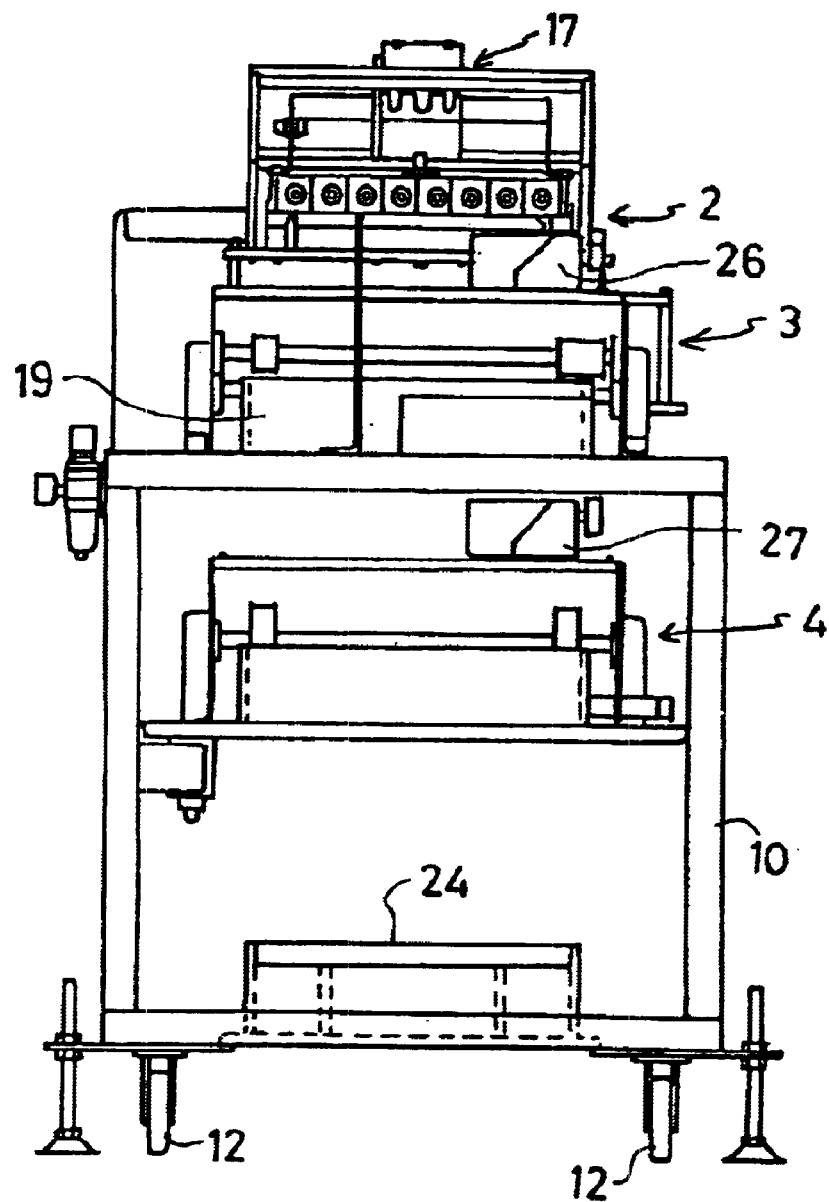
FIG. 3 is a right side view of the same.

First of all, an entire structure of a device for gel-coating seeds of the present invention will be described in accordance with FIGS. 1 to 3. The device for gel-coating seeds comprises a seed charging unit 1, a processing unit 2, a hardening unit 3 and a rinsing unit 4, which are all supported by a base frame 10. Base frame 10 can be easily carried because it is provided at its lower portion with casters 12.

Seed charging unit 1 comprises a hopper 13, absorption tips 16, a carrier 17 for moving absorption tips 16, and so on. Processing unit 2 is disposed at the upper middle portion of base frame 10. Processing unit 2 receives seeds from seed charging unit 1 and coats them with a gelling agent so as to form a predetermined size of gel-coated seeds which are then allowed to fall.

Hardening unit 3 comprises a tank 19 extended rightward from the lower portion of processing unit 2 on base frame 10. Hardener is filled in tank 19. Tank 19 is formed at its right end in opposite to processing unit 2 with a dropping outlet 20. A conveyor belt 21 is disposed above tank 19. Paddles 22 are provided at regular intervals on the outer surface of conveyor belt 21 so as to project perpendicularly to the conveying direction of conveyor belt 21. Conveyor belt 21 is driven with a motor 26.

Due to this structure, the unhardened gel-coated seeds dropped from processing unit 2 fall into tank 19 and are brought into contact with the hardener. Conveyor belt 21 is rotated such that paddles 22 push the gel-coated seeds in tank 19. Finally, the gel-coated seeds reach dropping outlet 20 and fall therefrom to rinsing unit 4. For adjusting the time for this hardening process, the rotary speed of motor 26 is controlled so as to adjust the speed of conveyor belt 21, thereby adjusting the degree of hardness of the gel-coats of seeds.

Rinsing unit 4 is disposed at an approximately middle portion in base frame 10. Rinsing unit 4 is extended leftward from the lower portion of dropping outlet 20 and formed at its left end with a final outlet 23. A product container 24 is located below final outlet 23. Rinsing unit 4 is structured similarly with hardening unit 3 such that paddles 28 provided on a conveyer belt 29 which is driven with a motor 27 convey the gel-coated seeds so as to drop them into product container 24.

In this structure, rinsing water is filled in a tank 25. The gel-coated seeds, which have been hardened to the predetermined degree, are dropped from dropping outlet 20 via a guide member 30 into the right end of rinsing tank 25 and sunk in the water. Motor 27 is rotated to convey the gel-coated seeds to outlet 23. During this conveying, the hardener is rinsed out of the gel-coated seeds, thereby stopping further hardening of the gel-coats of the seeds. Then, the gel-coated seeds are dropped from final outlet 23 into product container 14.

Figure 1:
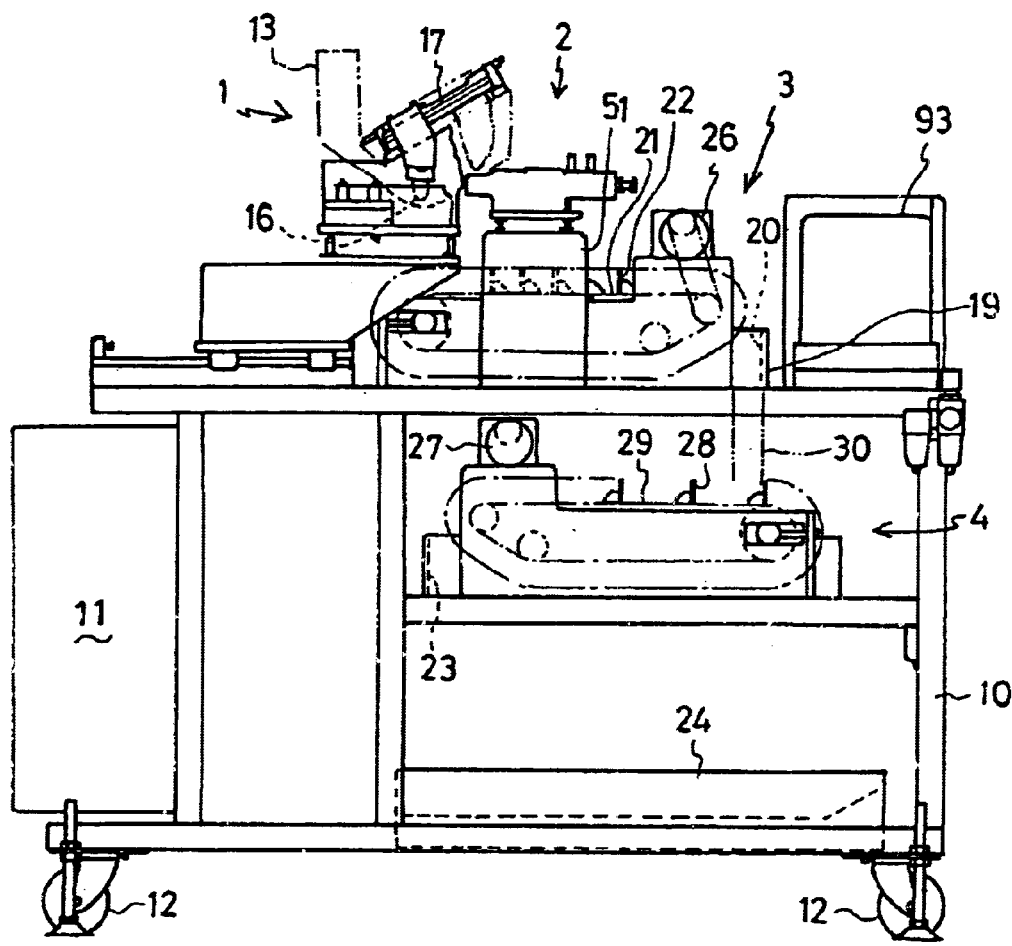
FIG. 1 is a front view of a device for gel-coating seeds according to the present invention.
Figure 4:
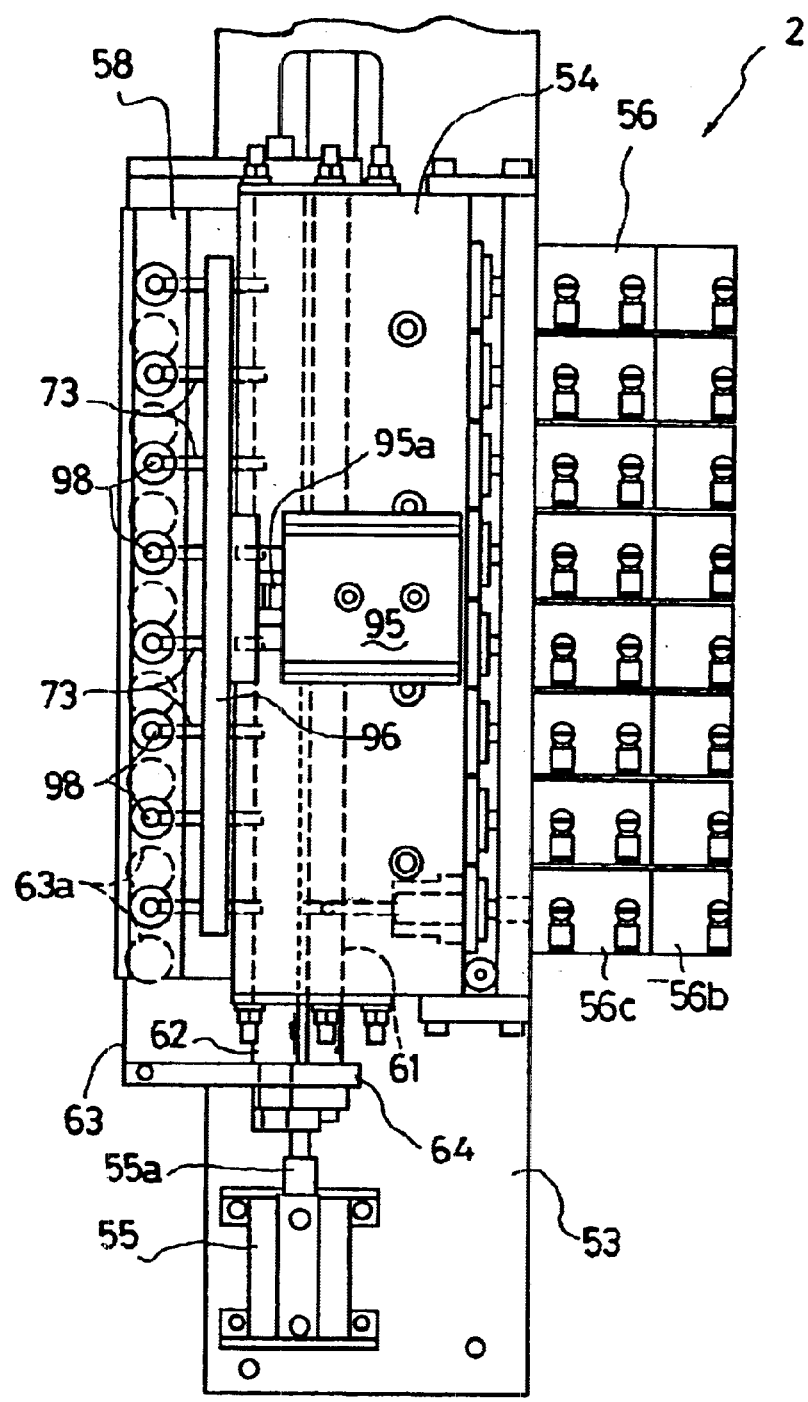
FIG. 4 is a plan view of a processing unit of the device.
Figure 5:
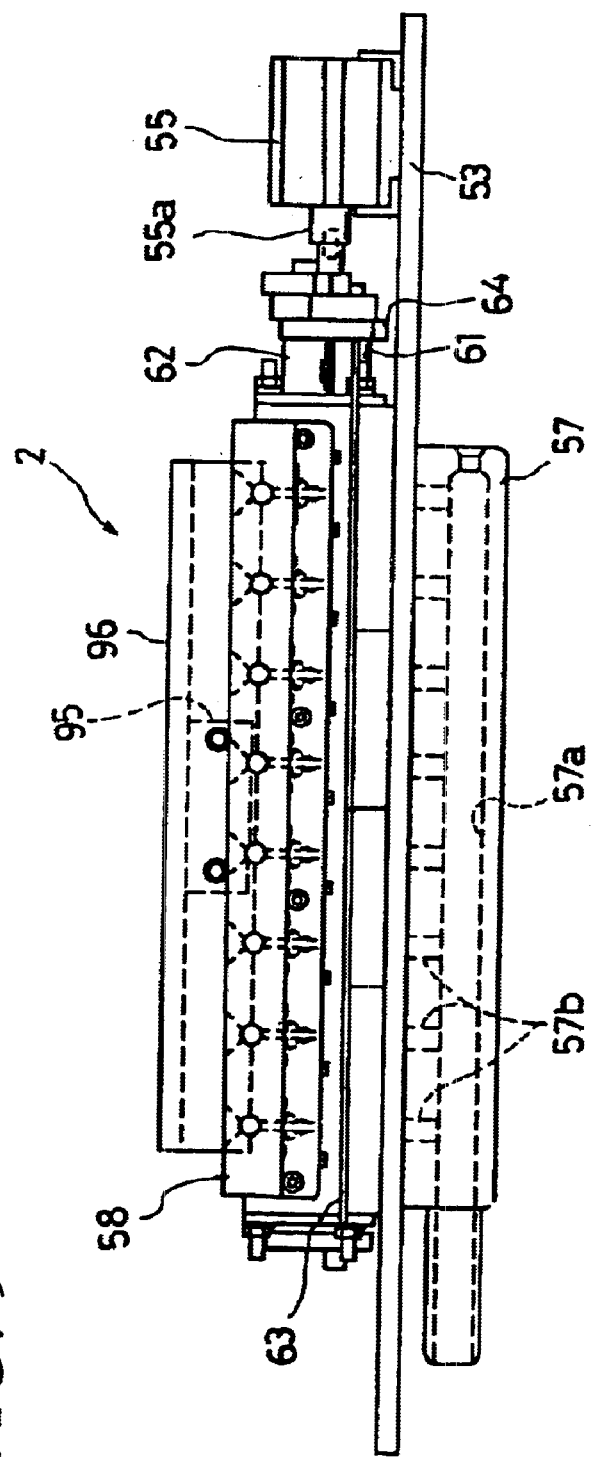
FIG. 5 is a left side view of the same.
Figure 6:
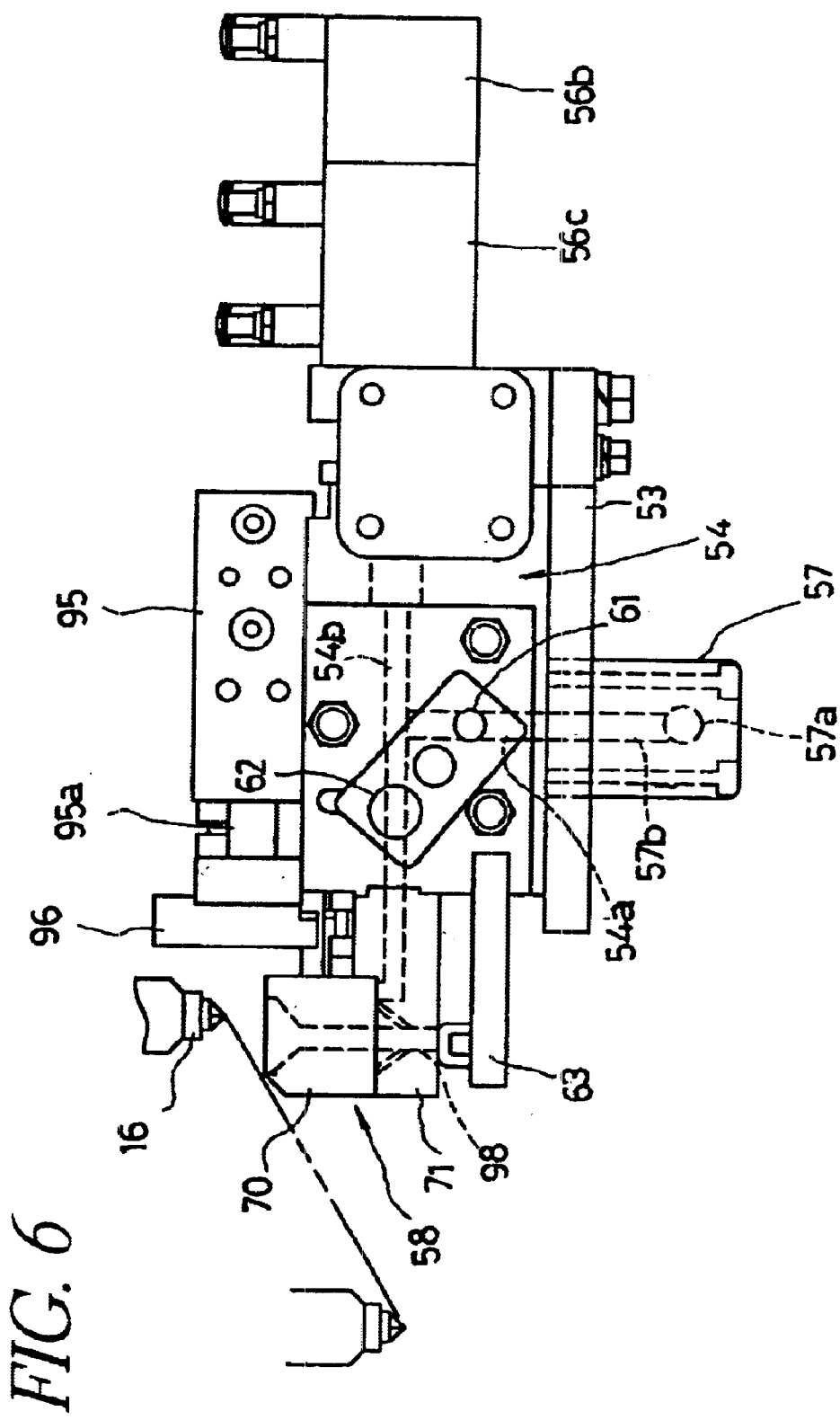
FIG. 6 is a sectional front view of the same.

Next, processing unit 2 will be detailed in accordance with FIGS. 1 and 4 to 6. As shown in FIG. 1, attachment plates 51 are erected respectively at front and rear ends on the approximately lateral middle portion of base frame 10. A base plate 53 is longitudinally laid between the top ends of attachment plates 51. As shown in FIGS. 4 to 6, on base plate 53 is fixed a longitudinally elongated valve casing 54. In front of valve casing 54 is disposed a valve cylinder 55, from which a piston rod 55a projects rearward toward valve casing 55a. At the right side of valve casing 54 are disposed a plurality of parallel discharging cylinders 56, from which respective piston rods 56a project toward valve casing 54. An air cylinder, an electromagnetic solenoid, a hydraulic cylinder or the like is adaptable to valve cylinder 55 and discharging cylinders 56. At the left side of valve casing 54 is fixedly provided a nozzle block 58 formed with a plurality of vertical nozzles 98 which are aligned longitudinally. Hence, processing unit 2 is provided with (in this embodiment, eight) discharging cylinders 56, nozzles 98 and the like which are respectively as many as absorption tips 16, thereby enabling gel-coating plural seeds simultaneously.

A first valve 61 and a second valve 62 which are formed into rods slidably penetrate valve casing 54 in the longitudinal direction. A horizontal plate serving as a shutter 63 is disposed below nozzle block 58. First valve 61, second valve 62 and shutter 63 are fixed at their front ends to a connection member 64 fixed to piston rod 55a of valve cylinder 55. Accordingly, piston rod 55a of valve cylinder 55 is actuated to move first valve 61, second valve 62 and shutter 63 together in the longitudinal direction, thereby simultaneously performing a later-discussed open-and-close operation of plural valve holes 61a and 62a and holes 63a of shutter 63.

A gel charge casing 57 is hung down from the underside of base plate 53 so as to be extended longitudinally along valve casing 54 above base plate 53. Gel charge casing 57 is longitudinally bored with a gel charge hole 57a. The rear end of gel charge hole 57a is brought into communication with a gelling (coating) agent tank (not shown) through a hose or the like. Gel charge casing 57 is further provided with a plurality of gel distribution holes 57b, which are extended upward from gel charge hole 57a and upwardly open. Base plate 53 is bored with a plurality of vertical through-holes in connection with respective gel distribution holes 57b.

Figure 7:
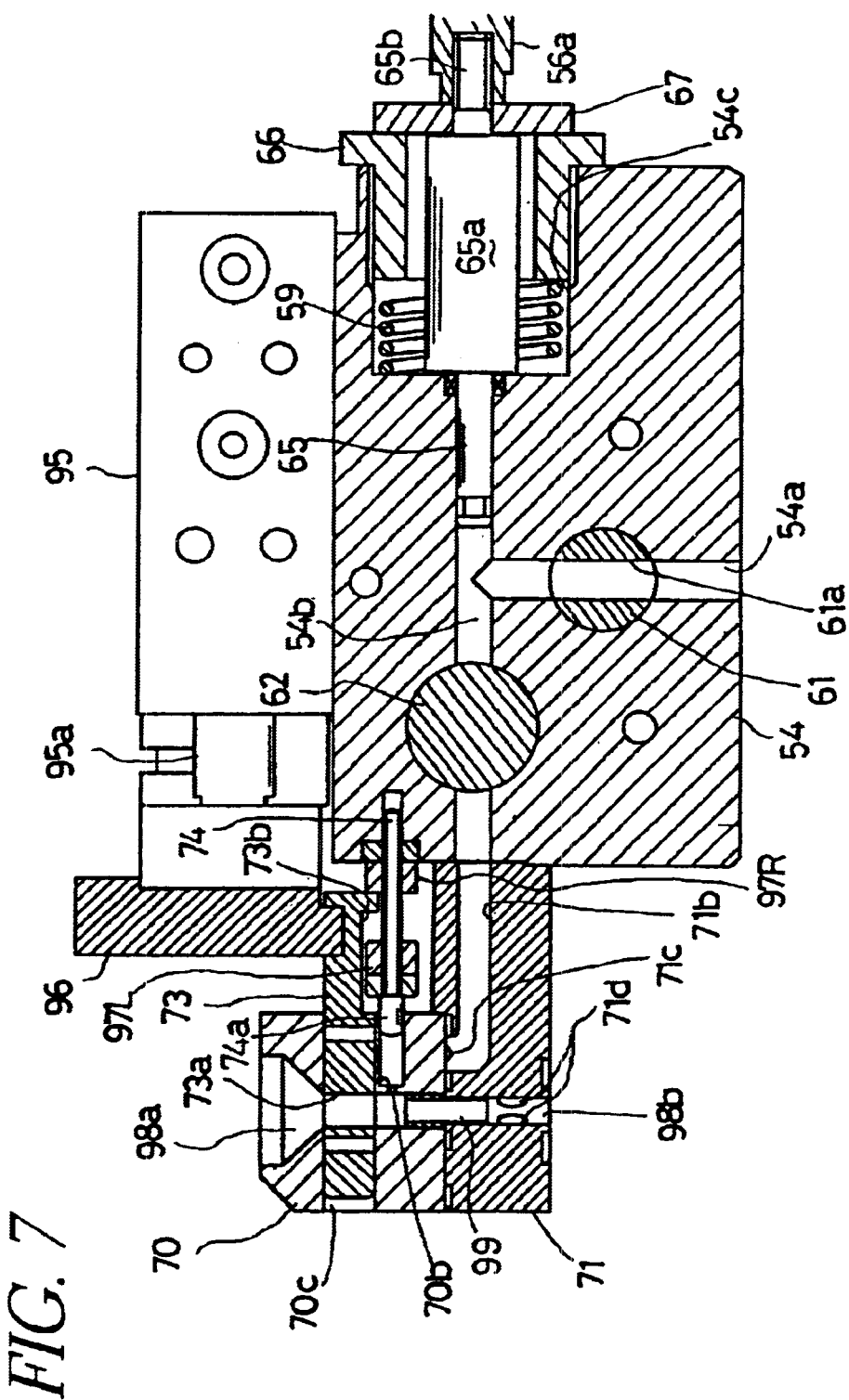
FIG. 7 is a sectional front view of a valve casing and a nozzle casing.

As shown in FIGS. 6, 7 and others, valve casing 54 is bored with plurality of first gel passages 54a which are vertically extended and downwardly open and which are aligned in the longitudinal direction. The lower open ends of first gel passages 54a are brought into communication with respective gel distribution holes 57b via the through-holes in base plate 53. Valve casing 54 is laterally bored through with second gel passage 54b aligned in the longitudinal direction. The top end of each first gel passage 54a is joined to a halfway portion of each second gel passage 54b. The left open ends of second gel passages 54b communicate with respective nozzles 98 of nozzle block 58, as discussed later. Valve casing 54 is formed with diametrically larger plunger chambers 54c, each of which is disposed at the right side of each second gel passage 54b and open toward piston rod 56a of each discharging cylinder 56.

First valve 61 is disposed so as to intersect all first gel passages 54a at their halfway portions. Second valve 62 is disposed at the left side of the junctions of all second gel passages 54b to first gel passages 54a (toward nozzles 98) so as to intersect all second gel passages 54b at their halfway portions. First valve 61 is vertically and diametrically bored through with valve holes 61a in correspondence to respective first gel passages 54a. Second valve 62 is laterally and diametrically bored through with valve holes 62a in correspondence to respective second gel passages 54b. As shown in FIG. 4, shutter 63 is formed vertically through with holes 63a in correspondence to respective drop holes 98b of nozzles 98.

First and second valves 61a and 62a and shutter 63 are located in the longitudinal direction so that, at the same time when valve holes 62a communicate with respective second gel passages 54b, holes 63a communicate with respective drop holes 98a and valve holes 61a are offset at their one pitches from their opening positions so as to block first gel passages 54a. Then, first and second valves 61a and 62a and shutter 63 are connected together with connection member 64. This state of first and second valves 61a and 62a and shutter 63 is established by locating piston rod 55a of valve cylinder 55 at a first actuating position. When valve holes 61a communicate with respective first gel passages 54a, valve holes 62a and holes 63a are offset at their one pitches from their opening positions so as to block second gel passages 54b and shut drop holes 98b. This state is established by locating piston rod 55a of valve cylinder 55 at a second actuating position.

As shown in FIG. 6, each plunger chamber 54c is formed at its right portion (its open side portion) into female screw. A cylindrical adjusting screw 66 whose outer end (right end) is formed into a flange is inserted into plunger chamber 54c while adjusting screw 66 engages at its periphery with the female screw. A plunger body 65a, which is diametrically larger than second gel passage 62b, is axially oriented in the lateral direction and disposed in plunger chamber 54c so as to be freely inserted in adjusting screw 66. In plunger chamber 54c is interposed a compressed spring 59 around plunger body 65a between the inward (left) end of plunger chamber 54c and the inward (left) end of adjusting screw 66. Compressed spring 59 is used as a cushion for a later-discussed stopper 67 when stopper 67 comes to abut against adjusting screw 66.

A plunger 65 whose diameter is approximately as large as that of second gel passage 54b projects coaxially from each plunger body 65a so as to be slidably inserted into each second gel passage 54b. Also, a thread rod 65b projects coaxially rightward (outward) from each plunger body 65a. Stopper 67 is screwed around each thread rod 65b to be allowed to abut against the outer end flange of adjusting screw 66. At the outside of stopper 67, each thread rod 65b is screwed into a female screw formed in a tip of each discharging cylinder 56. Therefore, plunger body 65a, plunger 65 and stopper 67 are actuated integrally with the actuation of each piston rod 56a. The position of piston rod 56a at the time when stopper 67 abuts against the flange of adjusting screw 66 is defined as the maximum extensive position thereof, which is adjusted by rotating adjusting screw 66 so as to adjust the position of its flange in the axial direction of adjusting screw 66. Therefore, the stroke of plunger 65, i.e., the position of the tip of plunger 65 at its maximum stroke is adjusted, thereby enabling adjusting the discharge amount of the gelling agent. Incidentally, the tip of plunger 65, even when adjusted at its leftward limit position (toward nozzle block 58), is located in each second gel passage 54b rightward (toward discharging piston 56) from the junction of second gel passage 54b with first gel passage 54a.

Discharging cylinders 56 are structured so that their piston rods 56a are extended at several steps. In this embodiment, as shown in FIG. 6, each discharging cylinder 56 is constituted by a first cylinder 56b and a second cylinder 56c connected with each other in series, thereby establishing two steps in its actuation. For the first step, first cylinder 56b is actuated to thrust out piston rod 56a together with a piston (not shown) of first cylinder 56b. For the second step, second cylinder 56c is actuated to thrust out only piston rod 56a separately from first cylinder 56b.

Description will be given on the control of first and second valves 61 and 62 and shutter 53, and the control of plungers 65 with the actuation of discharging cylinders 56 during one process of charging the gelling agent into the nozzles. At the beginning, while the gelling agent is filled from gel charging hole 57a to all gel passages 54a, piston rod 55a of valve cylinder 55 is actuated to the first actuating position. Therefore, first valve 61 blocks first gel passages 54a, in other words, valve holes 61a are offset from respective first gel passages 54a so as not to send the gelling agent to gel charge casing 57 during the next extensive slide of plungers 65. Simultaneously, second gel passages are fully opened with respective valve holes 62a of second valve 62. At this time, shutter 63 is located to arrange holes 63a just under respective drop holes 98b of nozzles 98.

From this condition, the plurality of discharging cylinders 56 are simultaneously actuated to advance plungers 65 slidably, thereby discharging the gelling agent, which has been filled in second gel passages 54b, into respective nozzles 98. More specified, the first actuation step of discharging cylinders 56 is established such that first cylinders 56b is actuated to slightly advance plungers 65 (leftward). Therefore, a little amount of the gelling agent is discharged and formed into gel-membranes which are blocked in respective drop holes 98b at the lower end portions of nozzles 98. Then, seeds are dropped from absorption tips 16 above respective nozzles 98 and held in the gel-membranes at respective drop holes 98b of nozzles 98. Next, the second actuation step of discharging cylinders 56 is established such that second cylinders 56c are actuated to further advance plungers 65, thereby thickening the gel-membranes holding the seeds in respective nozzles 98. When the gel-membranes become sufficiently thick, the gel-coated seeds fall with their empty weight from respective drop holes 98b through holes 63a of shutter 63 so as to be transferred to hardening unit 3 for the next process.

Then, piston rod 55a of valve cylinder 55 is switched to the second actuating position. Therefore, holes 63a of shutter 63 are offset from respective drop holes 98b of nozzles 98 so as to prevent nozzles 98 from leaking the gelling agent through drop holes 98b. Simultaneously, second valve 62 blocks second gel passages 54b so as to stop the gelling agent from being discharged to nozzles 98. First valve 61 opens first gel passage 54a with valve holes 61a so as to fill the gelling agent from gel charging hole 57a through respective first gel passages 54a to the upstream sides of second valve 62 in respective second gel passages 54b, thereby being prepared for the next process of gel-discharging to nozzles 98.

Figure 9:
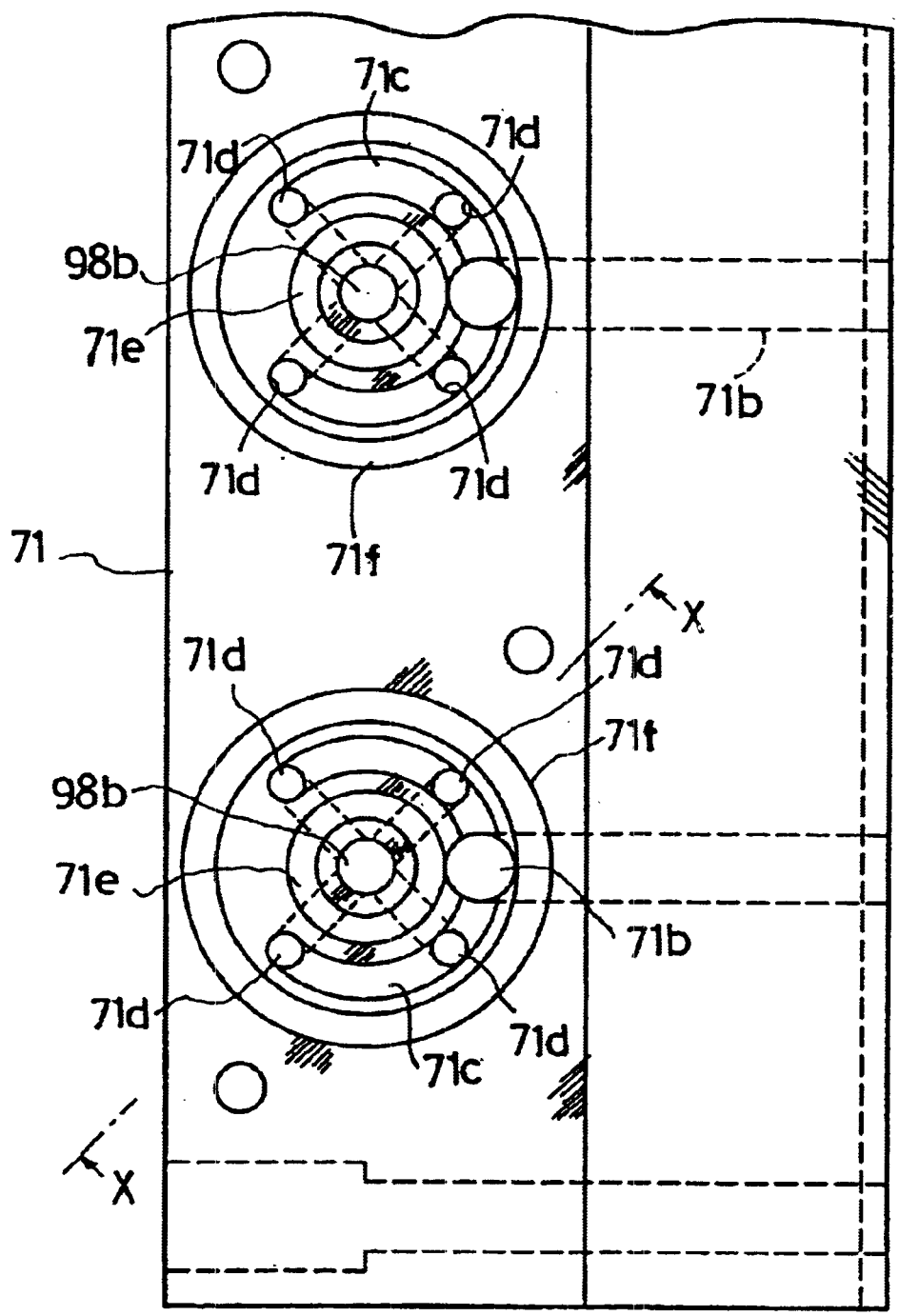
FIG. 9 is a fragmentary sectional plan view of a lower nozzle casing.
Figure 10:
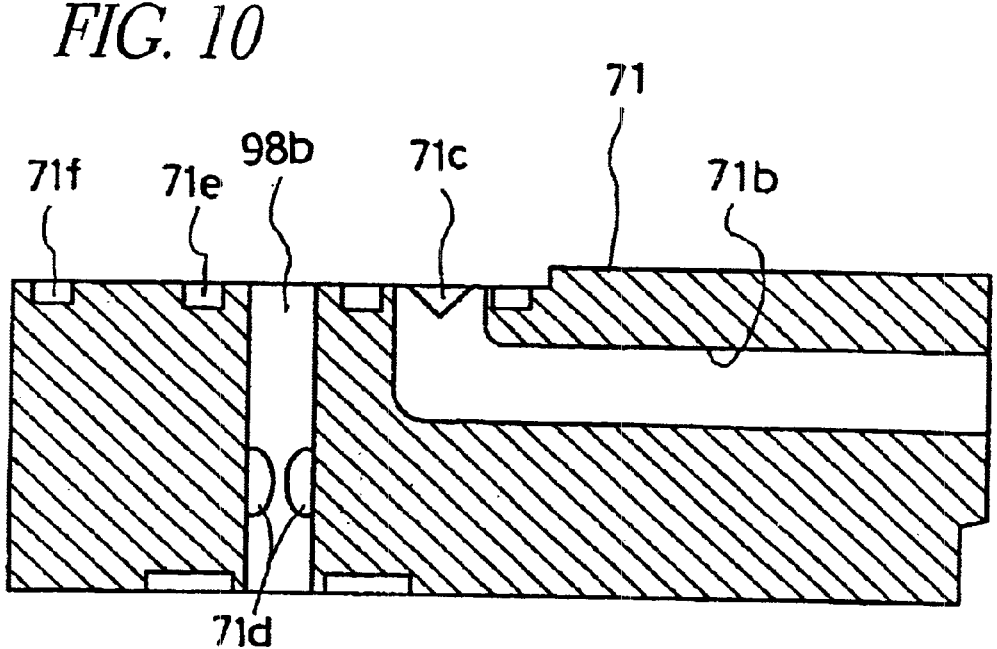
FIG. 10 is a sectional front view of a gel passage in the lower nozzle casing.

Description will be given on the structure of nozzle block 58. As shown in FIGS. 7, 9 and 10, nozzle block 58 comprises an upper casing 70 and a lower casing 71. The left top portion of lower casing 71 is made to fall a degree so as to form a joint surface. Upper casing 70 is spaced from the left end surface of valve casing 54 and fixedly placed on the joint surface. As shown in FIG. 4, a plurality of rods 73 laterally inserted into upper casing 70 project rightward so as to be disposed between the right end of upper casing 70 and the left end of valve casing 54.

Upper and lower casings 70 and 71 are formed vertically throughout with nozzles 98 which are as many as absorption tips 16. More specified, funnel-shaped casting holes 98a formed in upper casing 70 communicate with respective drop holes 98b formed in lower casing 71 through the joint surface between both casings 70 and 71.

Incidentally, a pipe 99 penetrates the joint surface between both casings 70 and 71 so as to prevent each of seeds from being hitched on the step between casting hole 98a and drop hole 98b which are diametrically different from each other.

Figure 11:
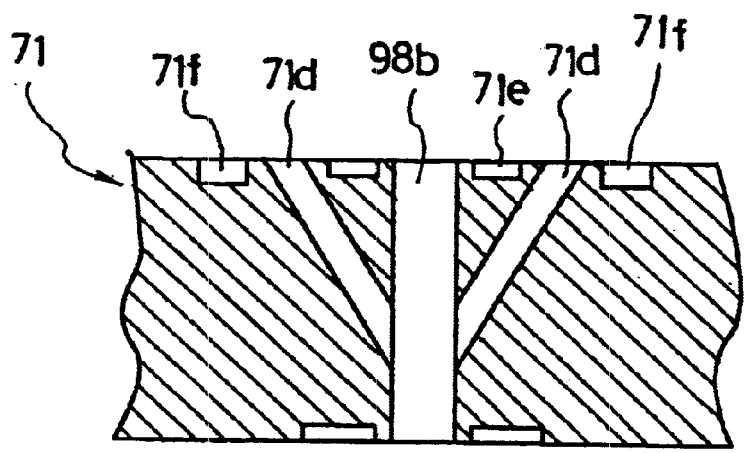
FIG. 11 is a sectional view taken along an X—X line of FIG. 9.

As shown in FIGS. 9 to 11, lower casing 71 is laterally bored with connection holes 71b whose right ends communicate with respective second gel passages 54b. The left ends of connection holes 71b are curved vertically upward to be open at the joint surface between upper and lower casings 70 and 71.

As shown FIG. 9 and others, on the joint surface of lower casing 71 are formed distribution grooves 71c, which are circular centering respective drop holes 98b in horizontal section when viewed in plan. Distribution grooves 71c, serving as galleries for the gelling agent, communicate with open ends of respective connection holes 71b. Each distribution groove 71c is formed over a range of 270° from left-rear 45° position to left-front 45° position with respect to each drop hold 98b. Discharging holes 71d are bored in lower casing 71 at 90° intervals from four positions of front and rear leftward 45° positions and front and rear rightward 45° positions, which are symmetric to the front and rear leftward 45° positions, in each distribution groove 71c. The lower ends of four discharging holes 71d are connected to a lower peripheral surface of each drop hole 98b with the same height such that the gelling agent can be discharged into the lower portion of each drop hole 98b from four directions at 90° intervals.

Furthermore, on the top joint surface of lower casing 71 is formed seal grooves 71e and 71f, which are circular centering each drop hole 98b. In the radial direction of each drop hole 98b, seal groove 71e is disposed inward from distribution groove 71c and seal groove 71f is disposed outward from distribution groove 71c. Seals are engaged into respective seal grooves 71e and 71f, and then, upper casing 70 is fixedly mounted on lower casing 71. Therefore, the seal in seal groove 71f prevents the gelling agent from leaking outward along the joint surface of casings 70 and 71 from each distribution groove 71c. Also, the seal in seal groove 71e prevents the gelling agent from leaking inward to nozzle 98 from each distribution groove 71c.

In this manner, the gelling agent discharged from each second gel passage 54b by plunger 65 flows into each distribution groove 71c through each connection hole 71b so as to be evenly distributed among discharging holes 71d, and is discharged into the lower portion of each nozzle hole 98b so as to surely block this portion. Therefore, in each nozzle 98 is surely formed the gel-membrane for catching and holding a seed dropped thereinto, thereby surely forming gel-coated seeds. Consequently, the precision of processing gel-coated seeds can be improved.

Figure 8:
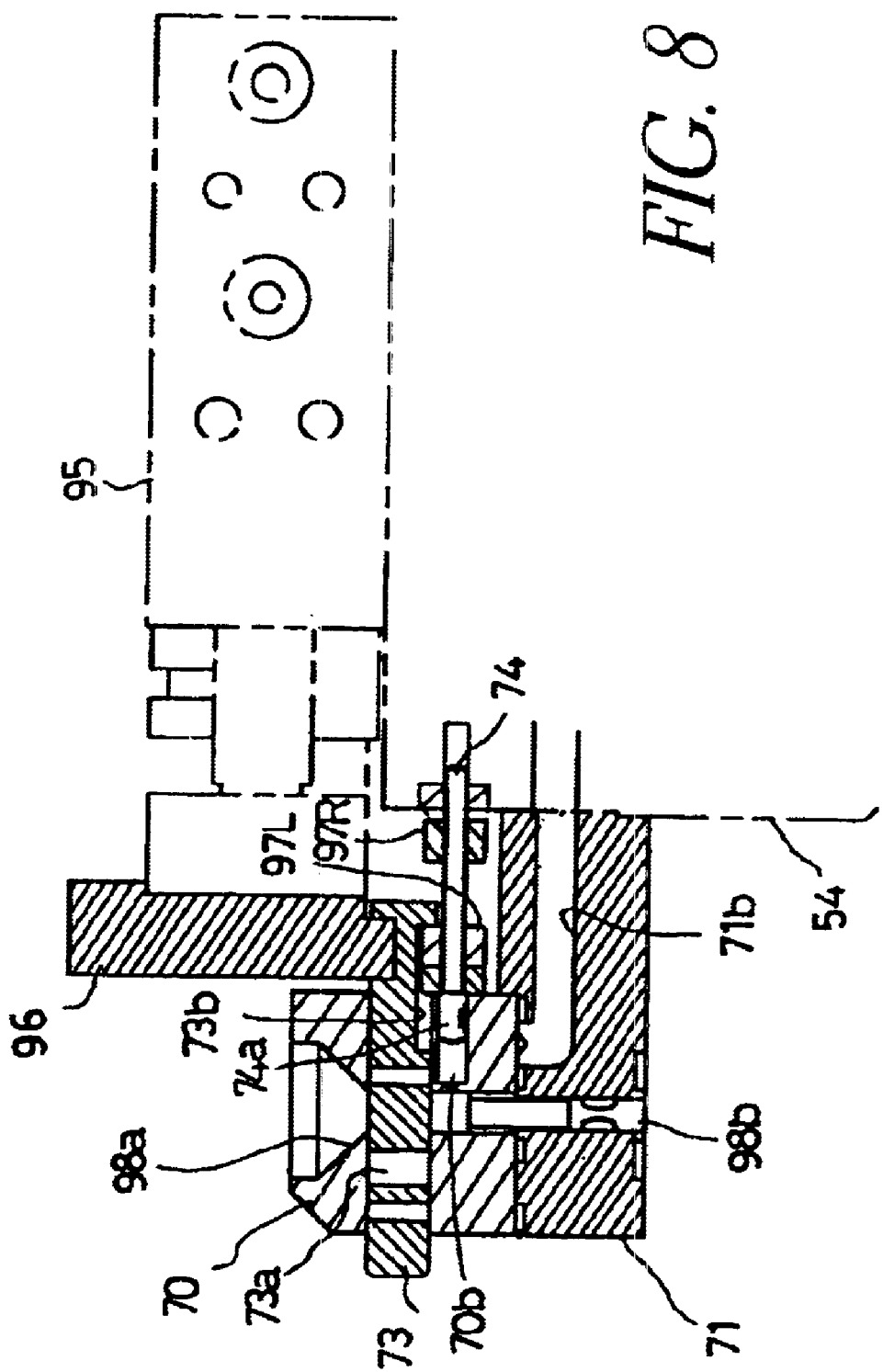
FIG. 8 is a sectional front view of the same wherein an open/close rod and a compression pin in the nozzle casing are slid leftward.

Upper casing 70 is laterally bored with insertion holes 70c intersecting respective casting holes 98a. Open/close rod 73 is laterally slidably inserted into each insertion hole 70c. Open/close rod 73 is a switching member which forms an intermediate portion of each nozzle 98 (casting hole 98a) into an open/close portion. Each open/close rod 73 is bored vertically throughout with a hole 73a in correspondence to each casting hole 98a. Right end portions of open/close rods 73 project rightward from upper casing 70 and engage with a single interlocking plate 96 which is approximately as long as nozzle block 58 in the longitudinal direction. Therefore, right end portions of open/close rods 73 are connected through interlocking plate 96 to a tip of a piston rod 95a of a nozzle open/close cylinder 95 disposed on the upper longitudinal middle portion of valve casing 54. An air cylinder, an electromagnetic solenoid or a hydraulic cylinder may be provided as nozzle open/close cylinder 95. Consequently, by single nozzle open/close cylinder 95, open/close rods 73 of respective nozzles 98 fixed to interlocking plate 96 are simultaneously slid in respective insertion holes 70c. Nozzles 98 are opened when holes 73a are located coaxially with respective casting holes 98a of nozzles 98, as shown in FIG. 7. And, nozzles 98 are blocked when holes 73a are offset from so as to make the body of open/close rod 73 cross nozzles 98, as shown in FIG. 8. Thus, nozzles 98 are switched between their opened state and their blocked state. Incidentally, the right portion of each open/close rod 73 projecting rightward from the right side portion of upper casing 70 is formed at its bottom surface with a laterally long groove 73b.

In upper casing 70, air chambers 70b are formed just below respective insertion holes 70c so as to communicate with respective insertion holes 70c through respective casting holes 98a and orifices. Air chambers 70b are open rightward. Compression pins 74 are laterally extended and formed at their left ends with respective pistons 74a, which are laterally slidably inserted into respective air chambers 70b. The right ends of compression pins 74 are slidably inserted into the left portion of valve casing 54.

Each compression pin 74 is threaded around. Left and right pin stoppers 97L and 97R, which are nut-shaped, are laterally adjustably fit around each compression pin 74. Each right pin stopper 97R is disposed between the right end of each open/close rod 73 and the left end surface of valve casing 54. A top portion of left pin stopper 97L is arranged in groove 73b. As shown in FIG. 7, when open/close rods 73 are located to open respective casting holes 98a through their holes 73a, the right ends of open/close rods 73 abut against respective right pin stoppers 97R. At this time, piston rod 95a of nozzle open/close cylinder 95 is located at its most retractive position, which is defined as its nozzle opening position. As piston rod 95a is extended, the right ends of open/close rods 73 come to abut against respective left pin stoppers 97L in grooves 73b and push respective compression pins 74 leftward. Therefore, as shown in FIG. 8, open/close rods 73 block respective casting holes 98a so that pistons 74a are deeply inserted in respective air chambers 70b so as to charge air under pressure from air chambers 70b into casting holes 98b below respective open/close rods 73 through the orifices. Consequently, the air is charged to drop holes 98b. Incidentally, by adjusting the position of left pin stopper 97L on compression pin 74, the timing when each open/close rod 73 comes to abut against left pin stopper 97L by extensive action of piston rod 95a is adjusted. Therefore, the sliding degree of each piston 74a in air chamber 70b, i.e., the amount of air charged into each casting hole 98a can be adjusted.

In the foregoing structure of nozzles comprising an open/closing structure and an air pressure-charging structure, description will be given on the actuating timings of open/close rods 73 and compression pins 74 by controlling nozzle open/close cylinder 95 during forming gel-coated seeds in the nozzles in association with the control of valve cylinder 55 and discharging cylinders 56 for filling the gelling agent into the nozzles.

At the beginning, as mentioned above, when piston rod 55a of valve cylinder 55 is located at the first actuating position so that second valve 62 is opened and that first valve 61 is closed, discharging cylinders 56 are actuated to the first actuation step so as to extensively actuate first cylinder 56b for discharging a little amount of the gelling agent, thereby forming the gel-membranes in the lower portions of drop holes 98b. At this time, open/close rods 73 are located rearward so as to open respective casting holes 98a through respective holes 73a. Then, the seeds are dropped from absorption tips 16 and fall onto the gel-membranes formed in the lower portions of respective drop holes 98b.

After the seeds fall, discharging cylinders 56 are actuated to the second actuation step so that second cylinders 56c are extensively actuated to discharge the gelling agent into the lower portions of drop holes 98b, thereby gel-coating the seeds and dropping the gel-coated seeds from the lower portions of respective drop holes 98b. Approximately simultaneously, nozzle open/close cylinders 95 are actuated, as shown in FIG. 8, so as to thrust open/close rods 73 into respective casting holes 98a and block casting holes 98a. Open/close rods 73 are further thrust in. Just before open/close rods 73 reach their limit positions, compression pins 74 with pistons 74a are thrust in so as to charge air from air chambers 70b into casting holes 98a.

Casting holes 98a are upwardly air-tightened by respective open/close rods 73 so that the pressure-charged air in casting holes 98a pressures downward the gel-coats plugging respective drop holes 98b so as to separate the gel-membranes including seeds from drop holes 98b. Therefore, the seeds coated with the gelling agent are dropped so as to be formed as gel-coated seeds. Hence, however small the seeds coated with the gelling agent may be so as to be impossible to fall with their empty weight, this charged-air enables the gel-membranes to be discharged from the lower portions of drop holes 98b without remains stuck on drop holes 98b, thereby surely forming gel-coated seeds. More specified, processing unit 2 is improved in its general versatility because it is adaptable to various sizes of seeds.

Air chambers 70b are formed in nozzle block 58 (lower casing 70), and the air-pressure is generated by reciprocating pistons 74b of compression pins 74 which actuate interlockingly with open/close rods 73 in the blocking actuation. By such a simple structure, air can be charged into drop holes 98b without another separate member such as a compressor, thereby saving costs.

After dropping the gel-coated seeds from drop holes 98b, nozzle open/close cylinder 95 is retractively actuated in the opposite direction (rightward) so as to slide open/close rods 73 rightward, thereby opening drop holes 98b so as to allow seeds to fall. Also, compression pins 74 are moved to the right side portions in respective air chambers 70b. This series of actuation is repeated so as to form gel-coated seeds continuously.

As shown in FIG. 1, a control box 11 is disposed on a left side portion of base frame 10. A controller is disposed in control box 11. Output means, which are conveyor motor 26 in hardening unit 3, conveyor motor 27 in rinsing unit 4, and valve cylinder 55, discharging cylinders 56 and open/close cylinder 95 in processing unit 2, are connected to the controller, and input means like various sensors are connected to the same. Therefore, the output means are controlled so as to establish the above-mentioned motions.

INDUSTRIAL FIELD OF THE INVENTION

A device for gel-coating seeds having the foregoing structure of nozzles according to the invention serve as a device which simultaneously coat many seeds in various sides with a gelling agent. Furthermore, by using this technique, a device for simultaneously coating many particles in various kinds and sides with gelling agent in various compositions may be structured.

What is claimed is:

1. A device for gel-coating seeds, comprising:
   a nozzle into which a gelling agent is filled and a seed is charged and held in said gelling agent so as to form a gel-coated seed which is then allowed to fall;
   a pair of upper and lower nozzle casings joined with each other through a joint surface, wherein said nozzle vertically penetrates said pair of upper and lower nozzle casings, and wherein said joint surface is arranged higher than a gel-filled portion of said nozzle;
   a gallery for said gelling agent formed on said joint surface; and
   a passage formed in said lower nozzle casing so as to extend from said gallery to said gel-filled portion below said gallery.

2. The device for gel-coating seeds as set forth in claim 1, wherein said gallery is a groove which is circular centering a sectional surface of said nozzle when viewed in plan.

3. The device for gel-coating seeds as set forth in claim 1, wherein said passage comprises one or more pairs of passages arranged at regular intervals, and wherein each of said pairs of passages are disposed in opposite to each other with respect to an axis of said nozzle to be connected to said gel-filled portion.

4. A device for gel-coating seeds, comprising:
   a nozzle into which a gelling agent is filled and a seed is charged and held in said gelling agent so as to form a gel-coated seed which is allowed to fall; and
   an open/close portion, which can be opened and closed, formed at an intermediate portion of said nozzle, wherein air can be charged under pressure into a portion of said nozzle between said open/close portion and a gel-filled portion of said nozzle, and
   wherein, at the same time when air is charged into said nozzle, said open/close portion is closed.

5. The device for gel-coating seeds as set forth in claim 4, further comprising:
   a nozzle casing forming said nozzle;
   an open/close member, in which a part of said nozzle is formed, reciprocally inserted into said nozzle casing so as to serve as said open/close portion;
   an air chamber formed in said nozzle casing so as to communicate to a portion of said nozzle between said open/close portion and a gel-filled portion of said nozzle; and
   a piston interlocking with said open/close member reciprocally inserted into said air chamber so as to charge air under pressure into said nozzle.

6. The device for gel-coating seeds as set forth in claim 5, having a plurality of said nozzles, further comprising:
   means for integrally reciprocating all said open/close members and said pistons, which are provided to respective nozzles.

* * * * *

UNITED STATES PATENT AND TRADEMARK OFFICE
CERTIFICATE OF CORRECTION

PATENT NO.    : 6,631,691 B1
DATED         : October 14, 2003
INVENTOR(S)   : Kazushi Nakatsukasa It is certified that error appears in the above-identified patent and that said Letters Patent is hereby corrected as shown below:

<u>Title page,</u>
Item [22], please change the PCT Filing date to -- February 12, 1999 --.

Signed and Sealed this

Sixth Day of January, 2004

JAMES E. ROGAN
*Director of the United States Patent and Trademark Office*